No. 662,126.  
F. L. LANE.  
Patented Nov. 20, 1900.
APPARATUS FOR MANUFACTURING FLANGED FLUES FOR BOILERS.
(Application filed Aug. 11, 1899. Renewed July 23, 1900.)
(No Model.)
6 Sheets—Sheet 1.
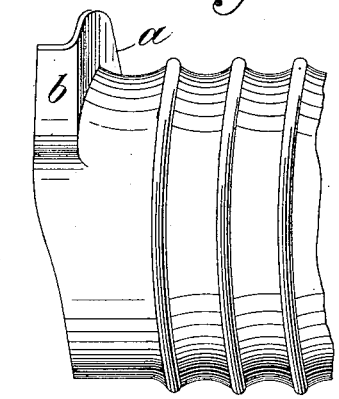
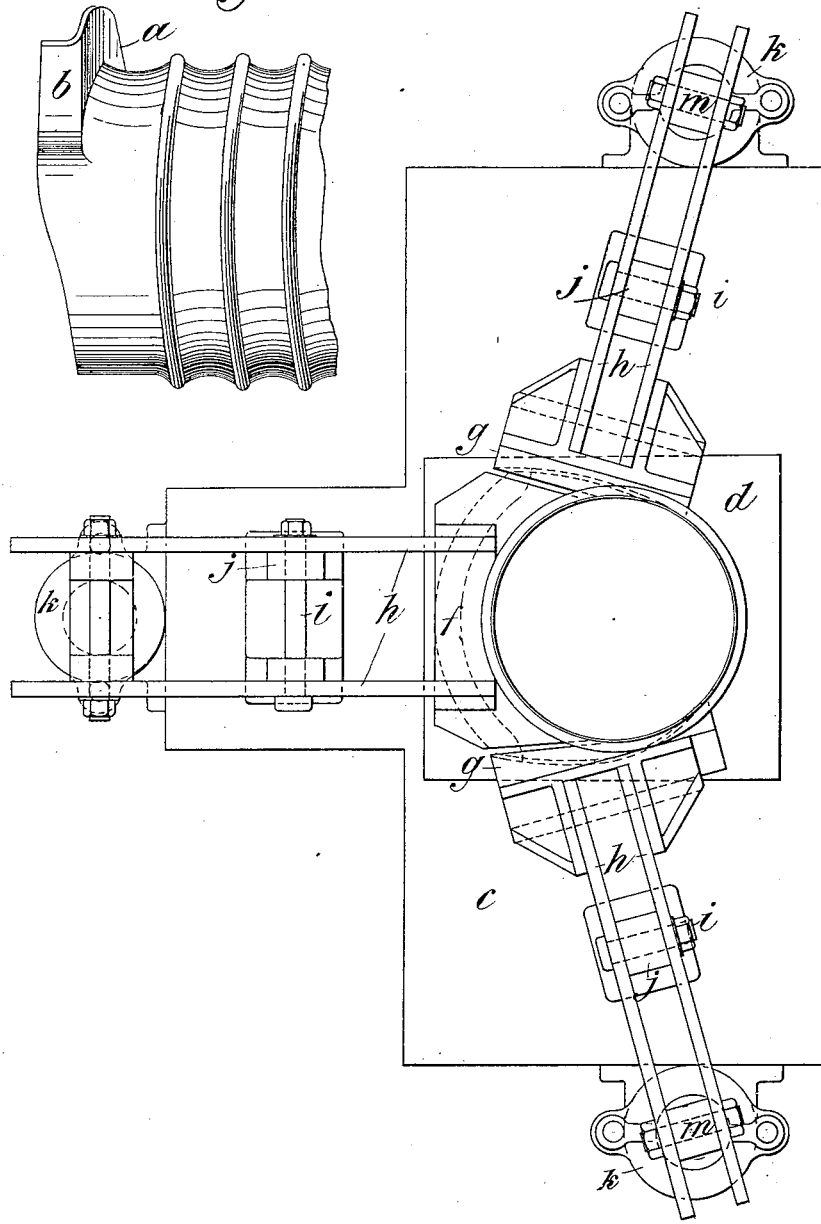
Witnesses:  
Clarence Paxton  
William L. English
Inventor:  
Francis Lawrence Lane  
By Julian C. Dowell  
His Atty.

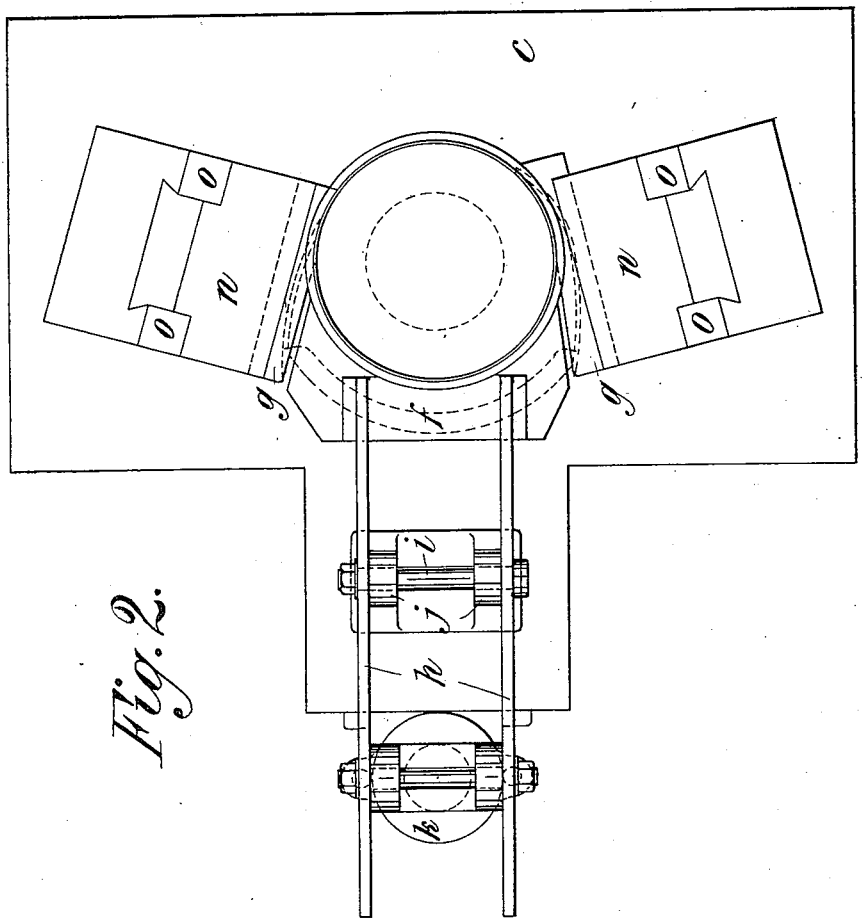

No. 662,126. Patented Nov. 20, 1900.
F. L. LANE.
APPARATUS FOR MANUFACTURING FLANGED FLUES FOR BOILERS.
(Application filed Aug. 11, 1899. Renewed July 23, 1900.)

(No Model.) 6 Sheets—Sheet 3.

Witnesses:
Inventor:
Francis Lawrence Lane,
By Julian C. Dowell
His Atty

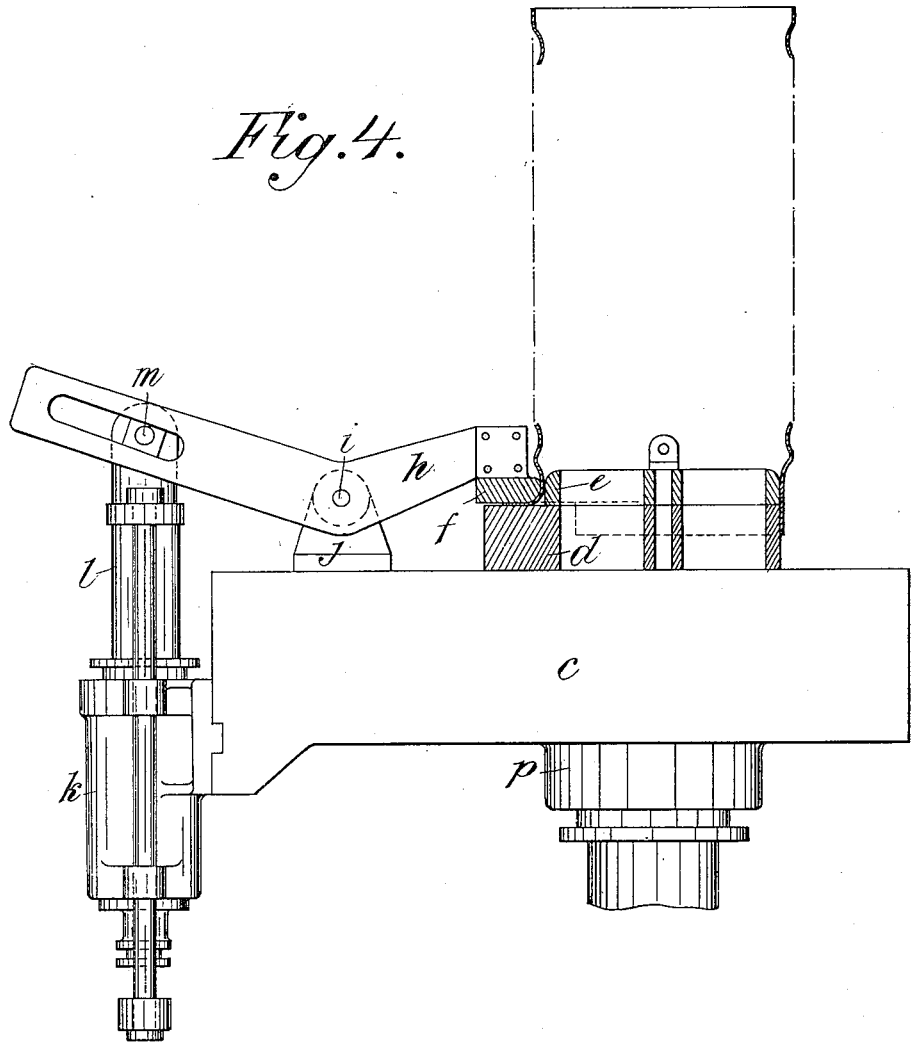

No. 662,126. Patented Nov. 20, 1900.
F. L. LANE.
APPARATUS FOR MANUFACTURING FLANGED FLUES FOR BOILERS.
(Application filed Aug. 11, 1899. Renewed July 23, 1900.)
(No Model.) 6 Sheets—Sheet 5.

Witnesses:
Inventor:
Francis Laurence Lane
By Julian C. Dowell
His Atty.

No. 662,126. Patented Nov. 20, 1900.
F. L. LANE.
APPARATUS FOR MANUFACTURING FLANGED FLUES FOR BOILERS.
(Application filed Aug. 11, 1899. Renewed July 23, 1900.)
(No Model.) 6 Sheets—Sheet 6
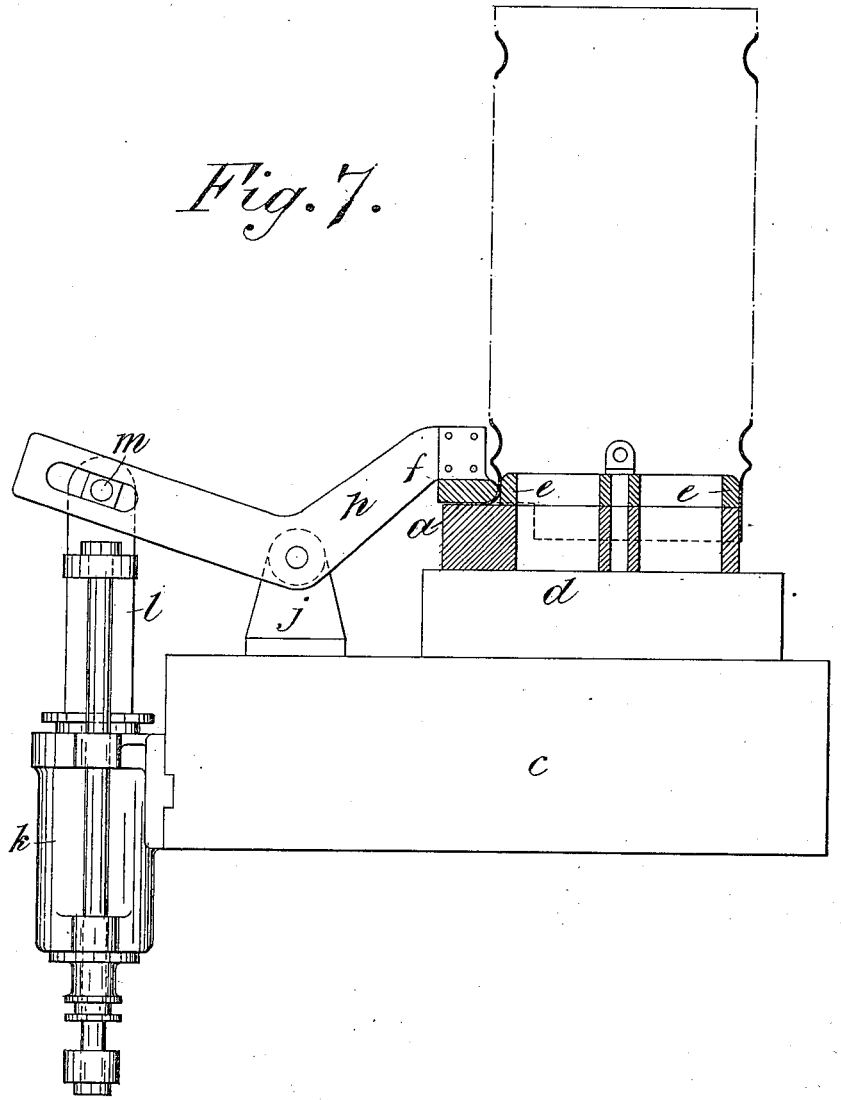

UNITED STATES PATENT OFFICE.

FRANCIS LAWRENCE LANE, OF LEEDS, ENGLAND, ASSIGNOR TO THE LEEDS FORGE COMPANY, LIMITED, OF SAME PLACE.

APPARATUS FOR MANUFACTURING FLANGED FLUES FOR BOILERS.

SPECIFICATION forming part of Letters Patent No. 662,126, dated November 20, 1900.

Application filed August 11, 1899. Renewed July 23, 1900. Serial No. 24,603. (No model.)

*To all whom it may concern:*

Be it known that I, FRANCIS LAWRENCE LANE, a subject of the Queen of Great Britain and Ireland, residing at Leeds, in the county of York, England, have invented Improvements in Machinery or Apparatus for Use in the Manufacture of Flanged Flues for Boilers, of which the following is a specification.

This invention has reference to machinery or apparatus for use in flanging boiler-flues of the kind having a tube-plate flange whose direction is at right angles to the axis of the flue and reverse flanges at the two opposite edges of the tube-plate flange, these reverse flanges merging into the wall of the circular or approximately circular portion of the flue.

The improved machinery or apparatus is intended to be used after the tube-plate flange has been produced in order to form the reverse flanges (while the metal is in a sufficiently-heated condition) by and between a bed, table, or "former" and suitable flanging tools or dies, means being provided for holding the tube-plate flange while the reverse flanges are being formed.

Figure 3:
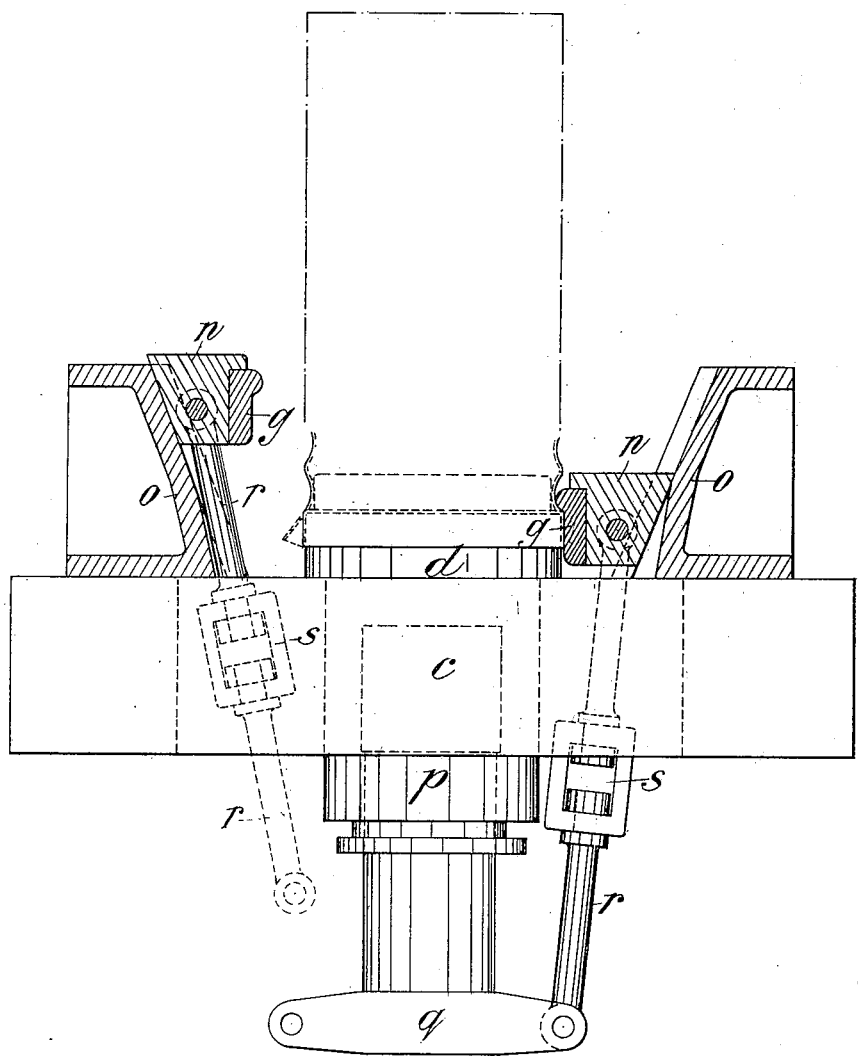

In the accompanying drawings, Figure 1 illustrates the back end of a corrugated flue having a tube-plate flange $a$ formed with reverse flanges $b$. Fig. 2 is a plan. Figs. 3 and 4 are sectional elevations at right angles to each other of one construction of apparatus according to this invention. Fig. 5 is a plan, Fig. 6 is a front elevation, and Fig. 7 a side elevation, partly in section, of a modified construction.

In the figures there is shown a flue in the flanging position, with the reverse flanges already formed. One of the flanging-dies of the apparatus is shown returned to its upper position, the other being shown as still in the position it will occupy when the flanging stroke has been completed. The presser or holder is shown gripping the tube-plate flange.

Referring to Figs. 2, 3, and 4, $c$ is the bed of the apparatus, on which is mounted a former $d$, which has a projecting portion on which rests the tube-plate flange $a$ already formed on the flue, as seen in Fig. 4. $e$ is a central retainer, which may be made so that its diameter can be varied and which serves to hold the flue in position upon the apparatus. $f$ is a flange presser or holder, and $g\ g$ are the flanging dies or tools by and between which and the former $d$ the reverse flanges are formed. The flange presser or holder $f$ is carried by a lever $h$, and the flanging tools or dies $g\ g$ are carried by blocks or carriages $n$ able to travel on inclined ways $o$ and operated simultaneously by means of a hydraulic ram $p$, connected to a cross-head $q$, to which each block or carriage $n$ is linked by means of connecting-rods $r$, the length of which can be adjusted by means of coupling-pieces $s$. In producing the reverse flanges the flue is placed in position upon the former $d$, being held in position by the retainer $e$, and the flange holder or presser $f$ is caused by actuating its lever to assume a position in which it will tightly grip between itself and the former $d$ the tube-plate flange $a$ of the flue, and so hold it securely while the flanging tools or dies are actuated, so as to bend over the lateral portions of the tube-plate to form the reverse flanges.

Figure 6:
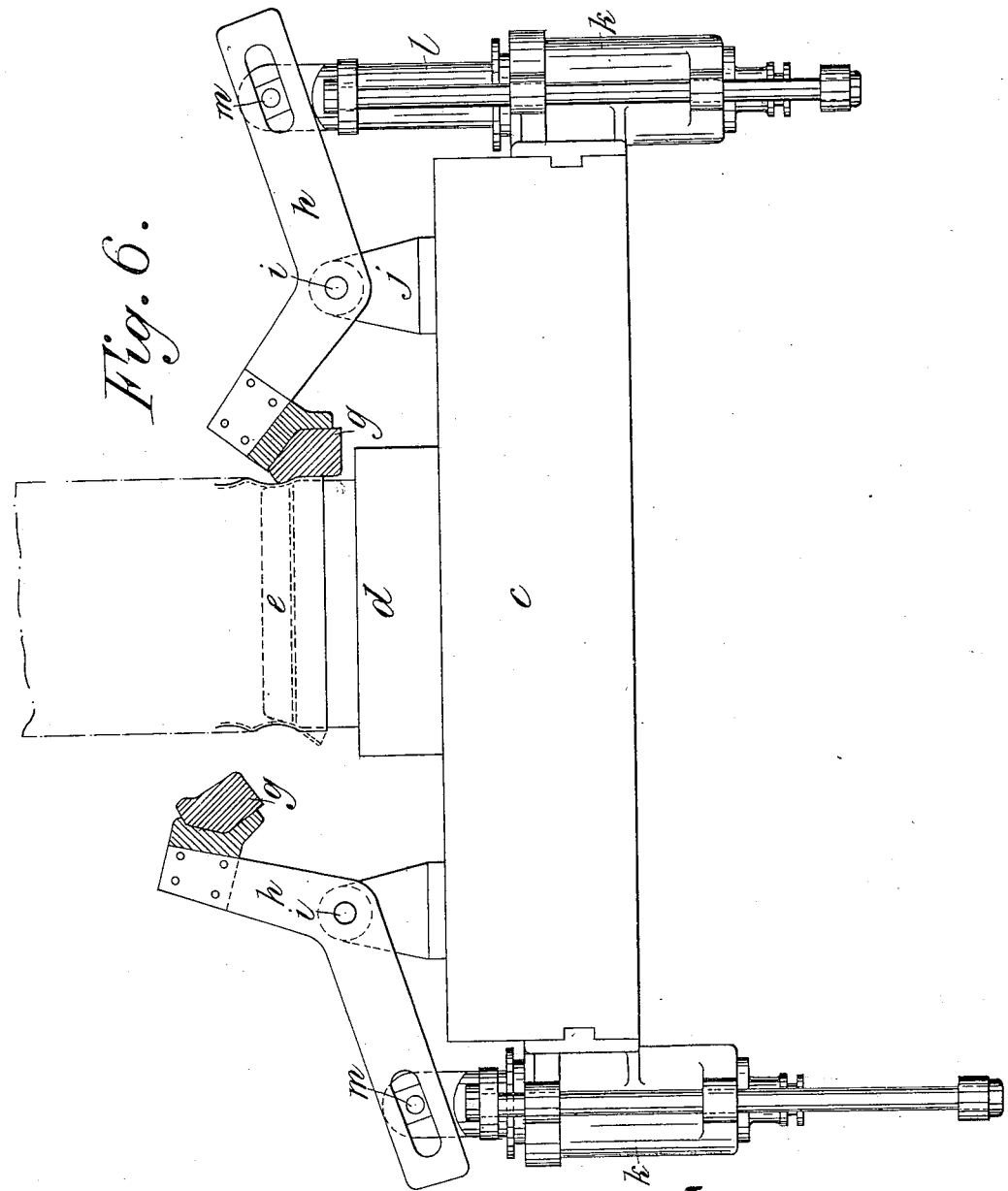

Referring to Figs. 5, 6, and 7, in this construction the presser or flange-holder $f$ is carried by a lever actuated by hydraulic or other power, as hereinbefore described, and the dies or tools are carried by levers $h$. The levers may, as shown, resemble bell-crank levers mounted on pins or pivots $i$ in brackets $j$, attached to the bed $c$. The levers can be operated independently by hydraulic rams $k$, to the plungers $l$ of which they are connected by suitable joints $m$, such as pin-block-and-slot arrangements, in such wise as to be thereby actuated.

The hydraulic rams can be fixed in certain positions relative to one another or might, if desired, be made capable of adjustment to admit of producing diverging or other reverse flanges. As will be seen in both these arrangements, the flanging dies or tools and the flange presser or holder during their downward movement approach the flue and during their return movement recede therefrom, thus leaving the flue free to be easily removed from the apparatus and another put in position to be operated upon.

What I claim is—

1. For producing reverse flanges on a flue already formed with a tube-plate flange, apparatus comprising a former, a flange presser or holder mounted on a lever, means for actuating same, a pair of flanging dies or tools and means for actuating same, as set forth.

2. For producing reverse flanges on a flue already formed with a tube-plate flange, apparatus comprising a former, a flange presser or holder mounted on a bell-crank lever actuated by hydraulic power, a pair of flanging dies or tools and means for actuating same, as set forth.

3. For producing reverse flanges on a flue already formed with a tube-plate flange, apparatus comprising a former, a flange presser or holder mounted on a bell-crank lever, means for actuating same, a pair of flanging dies or tools mounted on carriages able to travel on inclined ways, and means for actuating same, as set forth.

4. For producing reverse flanges on a flue already formed with a tube-plate flange, apparatus comprising a former, a flange presser or holder mounted on a bell-crank lever, means for actuating same, a pair of flanging dies or tools mounted on blocks or carriages able to travel on inclined ways and connected by links to the plunger of a hydraulic ram, as set forth.

5. For producing reverse flanges on a flue already formed with a tube-plate flange, apparatus comprising a former $d$ mounted on a bell-crank lever $h$, a hydraulic ram $k$, the plunger $l$ of which is connected to said lever, a pair of flanging dies or tools $g$ carried by blocks or carriages $n$ traveling on inclined ways $o$, a ram $p$, a cross-head $q$ upon the plunger thereof, and a pair of adjustable links $r$ connecting said cross-head to said blocks or carriages, as set forth.

Signed at Leeds, in the county of York, England, this 3d day of July, 1899.

FRANCIS LAWRENCE LANE.

Witnesses:
GEO. COOPER,
CHAS. GILLIARD.